United States Patent Office 2,780,630
Patented Feb. 5, 1957

2,780,630

TRICHLOROETHYLIDENEDIIMINO-BIS-THIAZOLE

Kenneth C. Kauer, Midland, Mich., assignor to The Dow Chemical Company, Midland, Mich., a corporation of Delaware No Drawing. Application May 4, 1956,
Serial No. 582,640

1 Claim. (Cl. 260—306.8)

This invention is directed to 2,2'-(2,2,2-trichloroethylidenediimino)bis-thiazole having the formula

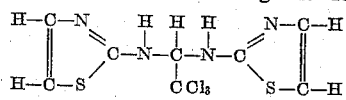

This new compound is a crystalline solid somewhat soluble in polar organic solvents and hot water and of limited solubility in cold water. The novel diimino-bis-thiazole has been found useful as an antimicrobial agent and particularly as an active toxicant for the control of bacteria such as Salmonella and Staphylococci and fungi such as Aspergillus and Rhizopus.

2,2'-(2,2,2-trichloroethylidenediimino)bis-thiazole may be prepared by reacting 2-aminothiazole with chloral at ordinary temperatures. The reaction is somewhat exothermic and proceeds readily when the reactants are contacted at temperatures above about 10° C. Good results are obtained when employing 2 moles of the 2-aminothiazole per mole of chloral in the reaction.

In practice, the reaction is conveniently carried out in a solvent such as absolute methanol or absolute ethanol. The reaction is initiated and proceeds rapidly when the reagents are contacted at a temperature above about 10° C. The rate of the reaction can be controlled by the rate of contacting the reagents or by external cooling, if desired. On completion of the reaction, the reaction mixture is cooled to precipitate the product. The latter may be isolated and purified by conventional procedures such as filtration, washing and recrystallization.

In a representative operation, 50 grams (0.5 mole) of 2-aminothiazole was dispersed in 100 milliliters of absolute ethyl alcohol at 15° C. and 37 grams (0.25 mole) of chloral added thereto portionwise with stirring. The temperature of the reaction mixture rose gradually from 15° to 42° C. and the reactants dissolved completely. On completion of the addition of chloral, stirring of the reaction mixture was continued for a period of time until the product precipitated in the form of a thick slurry. Thereafter, the reaction mixture was maintained at about 25° C. for 30 minutes, mixed with 350 milliliters of water and filtered to sepaarte the solid product. The latter was dissolved in 50 percent aqueous ethanol, treated with activated charcoal and recrystallized to obtain the desired 2,2' - (2,2,2 - trichloroethylidenediimino)bis - thiazole product as cream-colored flaky crystals melting at 148°–149° C.

The compound as prepared above was dispersed in nutrient agar to prepare nutrient media saturated with respect thereto. Portions of such media were streaked with actively growing broth cultures of *Staphylococcus aureus* and *Salmonella typhosa* and incubated at 35° C. for a period of 72 hours. Further portions of nutrient media containing the bis-thiazole compound were streaked with active spore suspensions of *Aspergillus terreus* and *Rhizopus nigricans* and the media incubated at 30° C. for 72 hours. After incubation, the above inoculated media were found to be free of growth of the respective organisms, while similarly inoculated and incubated portions of the basal nutrient media without the bis-thiazole compound were found to support vigorous growth of the test organisms.

I claim:

2,2'-(2,2,2-trichloroethylidenediimino)bis-thiazole.

No references cited.